United States Patent [19]
Wong

[11] Patent Number: 5,624,133
[45] Date of Patent: Apr. 29, 1997

[54] PREFILTER FOR GAS GENERATING AIR BAG INFLATOR

[75] Inventor: Hung S. Wong, Mesa, Ariz.

[73] Assignee: TRW Inc., Lyndhurst, Ohio

[21] Appl. No.: 548,432

[22] Filed: Oct. 26, 1995

[51] Int. Cl.⁶ .................................................. B60R 21/26
[52] U.S. Cl. ............................. 280/740; 280/741; 55/500; 55/509
[58] Field of Search ........................... 280/736, 740, 280/741, 742; 55/500, 509, 495, 498, 525, 526; 102/530, 531

[56] References Cited

U.S. PATENT DOCUMENTS

| | | | |
|---|---|---|---|
| 1,839,379 | 1/1932 | Downing | 55/509 |
| 2,048,718 | 7/1936 | Wemhoener | 55/509 |
| 4,005,876 | 2/1977 | Jorgensen et al. | 280/741 |
| 4,012,211 | 3/1977 | Goetz | 55/485 |
| 4,158,696 | 6/1979 | Wilhelm | 280/736 |
| 4,414,902 | 11/1983 | Strasser et al. | 102/531 |
| 4,817,828 | 4/1989 | Goetz | 280/736 |
| 4,878,690 | 11/1989 | Cunningham | 280/741 |
| 5,100,171 | 3/1992 | Faigle et al. | 280/736 |
| 5,221,107 | 6/1993 | O'Loughlin | 280/736 |
| 5,248,162 | 9/1993 | Levosinski et al. | 280/740 |
| 5,308,108 | 5/1994 | Rion | 280/740 |
| 5,318,323 | 6/1994 | Pietz | 280/736 |
| 5,340,147 | 8/1994 | Fontecchio et al. | 280/740 |
| 5,478,112 | 12/1995 | Knobloch | 280/741 |

FOREIGN PATENT DOCUMENTS 5-178157  7/1993  Japan ..................................... 280/736

Primary Examiner—Brian L. Johnson
Assistant Examiner—Peter C. English
Attorney, Agent, or Firm—Tarolli, Sundheim, Covell, Tummino & Szabo

[57] ABSTRACT

An apparatus (20) for inflating an air bag comprises a housing (22) which includes a wall (84) having an inner surface defining a chamber (108). Ignitable gas generating material (122) is located in the chamber (108) and, upon ignition, provides combustion products including gas which flows from the housing to inflate the air bag and hot particles. A tubular filter (140) removes hot particles from the gas flow. The tubular filter (140) comprises a strip of material having a plurality of spaced openings (146) through which the gas can flow and two end portions (160, 162) which overlap. The strip of material also has a plurality of projections (142, 144) engaging the inner surface of the housing (22). The projections (142, 144) are located on the strip of material at spaced locations around the tubular filter (140). The projections (142, 144) space at least a portion (148, 150 or 152) of the tubular filter (140) away from the inner surface of the housing (22). The filter (140) is contractible circumferentially and radially from a first expanded condition for insertion into the chamber (108). The filter (140) expands circumferentially and radially toward the first expanded condition to provide a forceful engagement of the filter with the inner surface of the wall (84) when the force contracting the filter is removed.

18 Claims, 2 Drawing Sheets

PREFILTER FOR GAS GENERATING AIR BAG INFLATOR

BACKGROUND OF THE INVENTION

1. Technical Field

The present invention relates to an inflator for an inflatable vehicle occupant restraint, such as an air bag, and in particular relates to a prefilter for an inflator having gas generating material which ignites to generate gas to inflate the inflatable vehicle occupant restraint.

2. Description of the Prior Art

An inflatable air bag which is inflated to protect an occupant in a vehicle when the vehicle encounters a situation which requires inflation of the air bag, such as a collision, is known. The air bag is in fluid communication with an actuatable inflator that provides inflation fluid for inflating the air bag.

One type of inflator includes ignitable gas generating material. The inflator is actuated by igniting the gas generating material. A common gas generating material includes a metal azide. Ignition of the gas generating material produces combustion products including hot nitrogen gas and hot particles. The nitrogen gas flows from the inflator to inflate the air bag. The flow of the nitrogen gas carries at least some of the hot particles with it.

A prefilter is typically located in the inflator and surrounds the gas generating material. Other filters in the inflator are located downstream of the prefilter. The prefilter is generally formed from a wire mesh. The prefilter cools the hot nitrogen gas and removes some of the hot particles from the flow of nitrogen gas.

SUMMARY OF THE INVENTION

The present invention is directed to an apparatus for inflating an inflatable vehicle occupant restraint, such as an air bag. The apparatus comprises a housing having a cylindrical inner surface which defines a chamber. An ignitable gas generating material is located in the chamber to produce, upon ignition, combustion products including gas to inflate the air bag and hot particles. A filter removes hot particles from the flow of the combustion products. The filter is a tubular cylinder and is located in the chamber between the gas generating material and the housing. The filter forcefully engages the cylindrical inner surface of the housing at spaced locations. Upon the application of a force, the filter is contractible circumferentially and radially from a first expanded condition for insertion into the chamber. The filter expands circumferentially and radially toward the first expanded condition to provide the forceful engagement with the cylindrical inner surface of the housing after the filter is inserted into the chamber and the force contracting the filter is removed.

The filter comprises a curved strip of material having two end portions which overlap. The end portions overlap to a greater extent when the filter is contracted from the first expanded condition for insertion into the chamber. The end portions overlap to a lesser extent when the filter returns toward the first expanded condition and forcefully engages the cylindrical inner surface of the housing. The strip of material is preferably metal and has a plurality of spaced apart openings through which gas can flow.

The strip of material also has at least one projection engaging the cylindrical inner surface of the housing. The projection spaces at least a portion of the filter away from the cylindrical inner surface of the housing. The projection extends around the entire outer circumference of the filter and engages the cylindrical inner surface of the housing. The projection forcefully engages the cylindrical inner surface of the housing along at least one substantially continuous and circumferentially extending line.

Preferably, the strip of material has a plurality of projections extending parallel to each other. The projections are spaced apart axially and extend around the outer surface of the filter. The projections forcefully engage the cylindrical inner surface of the housing along parallel, axially spaced apart, substantially continuous, circumferentially extending lines. The filter may also include a plurality of axially extending projections which are spaced apart around the outer circumference of the filter. The axially extending projections forcefully engage the inner surface of the housing along a plurality of circumferentially spaced apart, axially extending lines.

BRIEF DESCRIPTION OF THE DRAWINGS

Further features and advantages of the present invention will become apparent to those skilled in the art to which the present invention relates upon reading the following specification with reference to the accompanying drawings, in which.

DESCRIPTION OF PREFERRED EMBODIMENT

Figure 1:
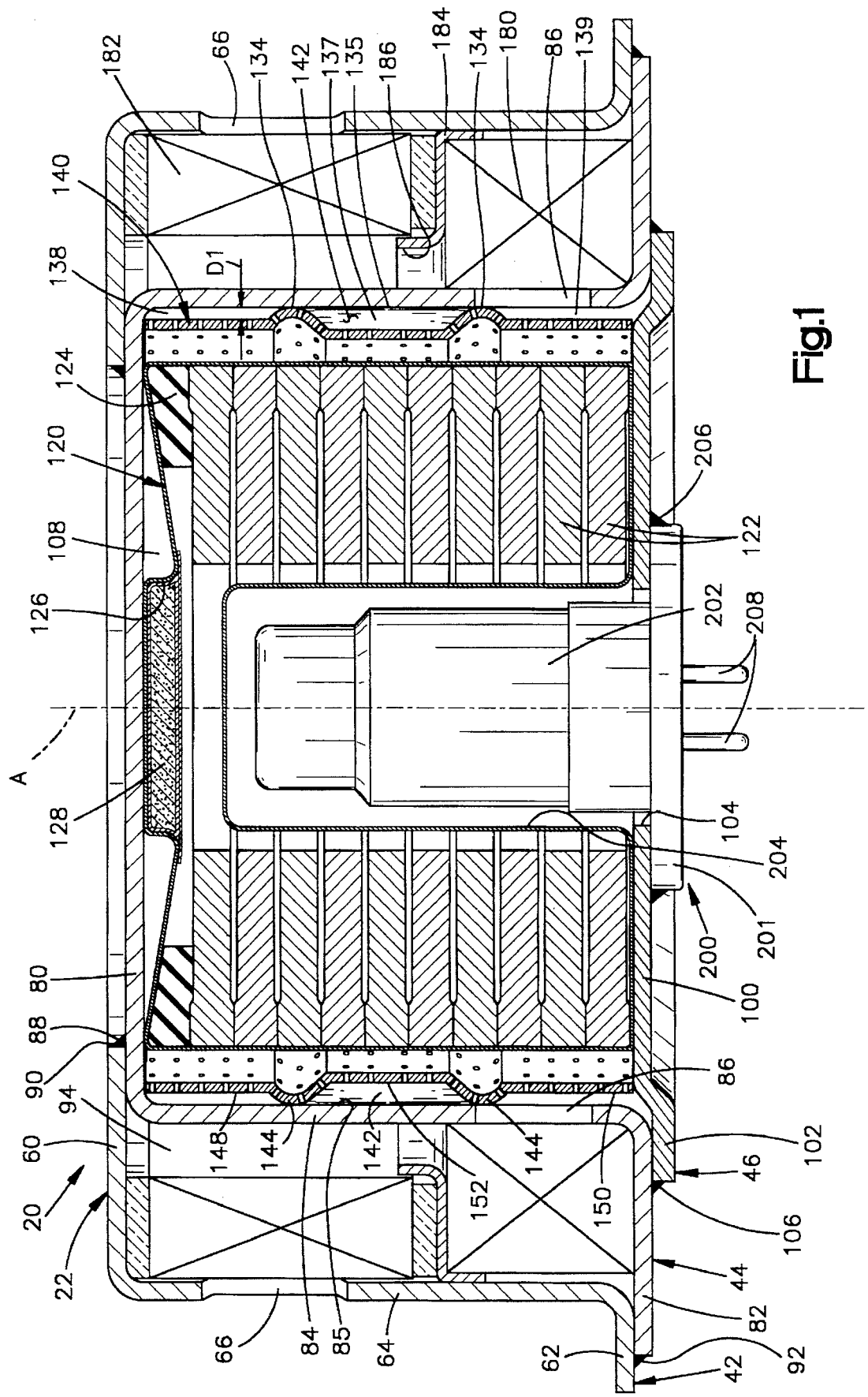
FIG. 1 is an enlarged sectional view of an air bag inflator embodying the present invention.

An actuatable inflator 20 (FIG. 1) provides inflation fluid for inflating an inflatable vehicle occupant restraint, such as an air bag. The inflator 20 is suitable for mounting on a vehicle steering wheel in a driver's side air bag module.

Upon a predetermined vehicle deceleration, such as occurs during a collision for which inflation of the air bag is desired, the inflator 20 is actuated. The inflation fluid flows from the inflator 20 to inflate the air bag. During inflation, the air bag inflates between the driver of the vehicle and the steering wheel and helps protect the driver from forcefully striking parts of the vehicle including the steering wheel.

The inflator 20 includes a housing 22. The housing 22 includes a diffuser 42, a combustion cup 44, and a cover 46. The diffuser 42, the combustion cup 44, and the cover 46 are made of metal, such as stainless steel.

The diffuser 42 is cup-shaped and includes an annular upper end wall 60, an annular lower end flange 62 and a cylindrical side wall 64 extending around a longitudinal central axis A of the inflator 20. The side wall 64 extends between and connects the upper end wall 60 and the lower end flange 62. The end wall 60 and the flange 62 are generally parallel to each other and generally perpendicular to the axis A. Outlet openings 66 extend through an upper portion of the side wall 64 of the diffuser 42 and are arranged in a circumferential array.

The combustion cup 44 is also cup-shaped and is located radially inside of the diffuser 42. The combustion cup 44 includes an upper end wall 80, a lower end flange 82 and a cylindrical side wall 84 extending around the axis A. The cylindrical side wall 84 has an inner side surface 85 and extends between and connects the upper end wall 80 and the lower flange 82. The upper end wall 80 and the lower flange 82 are generally parallel to each other and generally perpendicular to the axis A. A circumferential array of openings 86 extend through a lower portion of the side wall 84.

3

The upper end wall 80 of the combustion cup 44 is laser welded to the upper end wall 60 of the diffuser 42 at a continuous weld 88. The weld 88 is located in an opening 90 in the upper end wall 60 of the diffuser 42. The lower end flange 82 of the combustion cup 44 is laser welded to the lower end flange 62 of the diffuser 42 at a continuous weld 92. The diffuser 42 and the combustion cup 44 cooperate to define an annular filter chamber 94.

The cover 46 has a flat circular center portion 100 and an outer flange 102 that is generally parallel to and axially offset from the center portion. A circular opening 104 is located in the center portion 100 of the cover 46. The outer flange 102 of the cover 46 is welded to the flange 82 of the combustion cup 44 at a continuous circumferential weld 106. The combustion cup 44 including the inner side surface 85 of the side wall 84, and the cover 46 cooperate to define a combustion chamber 108 surrounding the axis A of the housing 22.

A hermetically sealed container 120 is located in the combustion chamber 108. A plurality of annular disks 122 of gas generating material are stacked within the container 120. An annular cushion 124 is disposed within the container 120 and between the uppermost gas generating disk 122, as viewed in FIG. 1, and the inside surface of an upper end wall of the container 120. The cushion 124 compresses during assembly of the inflator 20 to take up clearance between the gas generating disks 122 and the upper end wall of the container 120. The cushion 124 inhibits movement of the gas generating disks 122 within the container 120.

The gas generating disks 122 are made of a known material which, when ignited, produces combustion products, including hot nitrogen gas and hot particles. Although many suitable types of gas generating material could be used, a preferred gas generating material is one containing sodium azide. Sodium azide, upon combustion, produces hot particles, including molten metal particles. The particles are carried in the flow of nitrogen gas in a direction to exit the combustion chamber 108 through the flow openings 86.

A central recess 126 is formed in the upper end of the container 120. A portion of the material of the container 120 which defines the recess 126 engages the upper end wall 80 of the combustion cup 44. Auto-ignition material 128 is placed in the recess 126. Heat from the upper end wall 80 of the combustion cup 44 is conducted to the auto-ignition material 128 for igniting the auto-ignition material. Ignition of the auto-ignition material 128 ignites the gas generating disks 122.

A prefilter 140 is also located in the combustion chamber 108. The prefilter 140 (FIG. 2) is a tubular cylinder made from a curved strip of metal material, such as stainless steel, carbon steel or aluminum. The prefilter 140 is located radially outward of the container 120 and the gas generating disks 122 and radially inward of the inner surface of the cylindrical side wall 84 of the combustion cup 44.

Figure 2:
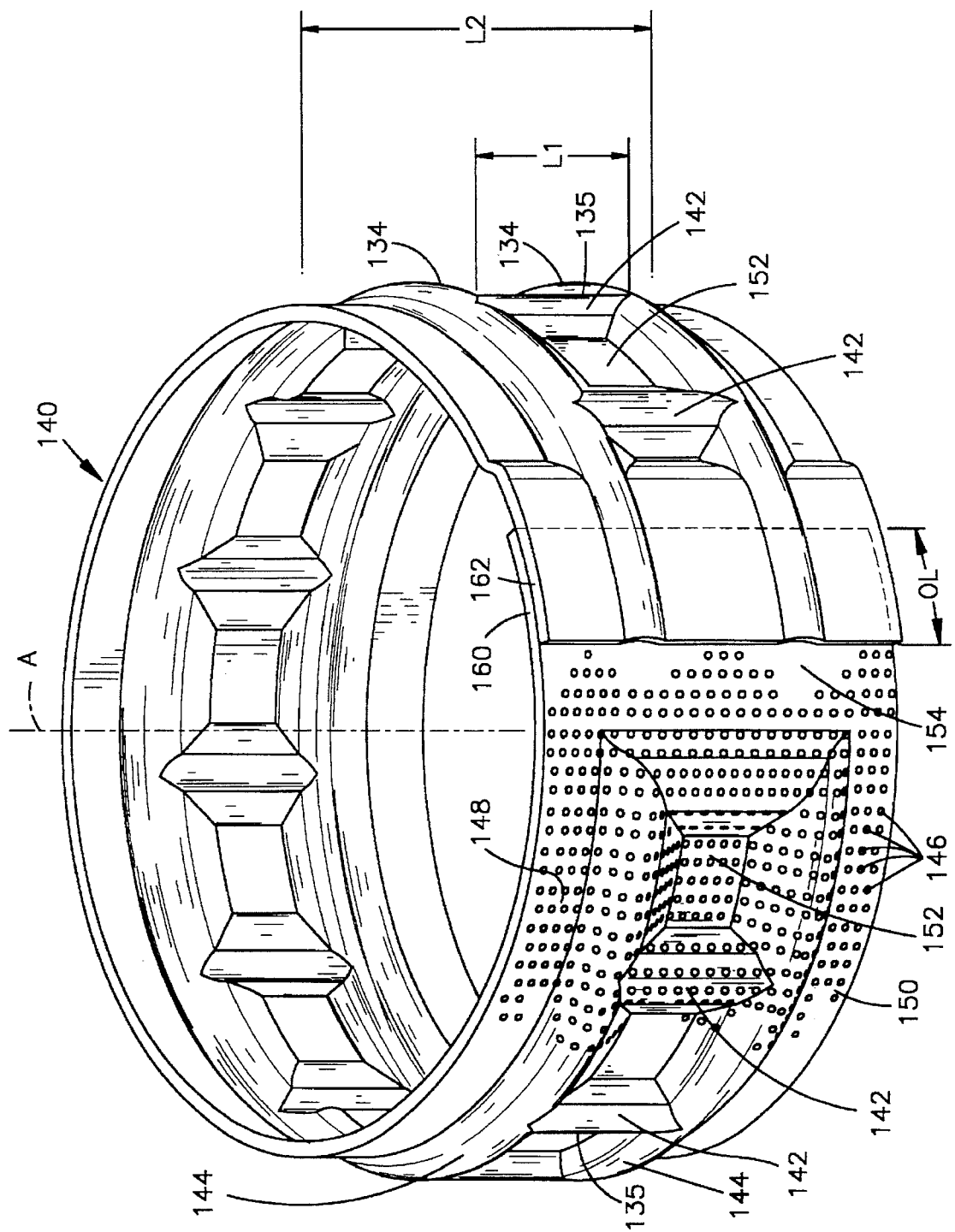
FIG. 2 is a perspective view of a prefilter used in the inflator of FIG. 1.

The prefilter 140 includes a plurality of openings 146 which are spaced around the entire prefilter. Only a representative number of the openings 146 are illustrated in FIG. 2. The openings 146 are formed in the strip of metal material prior to forming the prefilter into the tubular cylindrical shape illustrated in FIG. 2. Each of the openings 146 is circular and has a diameter in the range of approximately 0.0625 inch to 0.125 inch. It will be apparent that the openings 146 could be of any suitable size or shape. The opening ratio, which is the area of all of the openings 146 in the outer surface of the filter divided by the total area of the outer surface of a cylinder the size of the prefilter 140 but without openings, is in the range of approximately 0.30 to 0.50.

The openings 146 permit nitrogen gas and hot particles which are smaller than the openings to flow through the prefilter 140. Hot particles which are larger than the openings 146 cannot pass through the prefilter 140. The prefilter 140 also acts as a heat sink and cools the combustion products produced by burning of the gas generating disks 122. Cooling of the hot particles causes some molten metal particles to plate out on the surface of the strip of metal material forming the prefilter 140.

A plurality of circumferentially spaced projections 142 extend in an axial direction from the outer surface of the prefilter 140. The projections 142 extend for a distance L1, measured in a direction parallel to the axis A, which is less than the overall height L2 of the prefilter 140. The overall height L2 of the prefilter 140 is substantially equal to the height of the combustion chamber 108, measured parallel to the axis A between the inner surfaces of the center portion 100 of the cover 46 and the upper end wall 80 of the combustion cup 44.

The prefilter 140 also includes a pair of axially spaced circumferential projections 144 which extend continuously around the entire outer surface of the prefilter. Preferably, the axial projections 142 are located between, and intersect, the circumferential projections 144. The axial projections 142 and the circumferential projections 144 extend radially outward from the outer surface of the prefilter 140 a substantially equal distance D1 (FIG. 1).

An axial end portion 148 of the prefilter 140 is located above the upper circumferential projection 144, as viewed in FIGS. 1 and 2. Another axial end portion 150 of the prefilter 140 is located below the lower circumferential projection 144. A plurality of central portions 152 are located between the circumferential projections 144 and the axial projections 142.

Each of the circumferential projections 144 preferably engages the inner surface 85 of the cylindrical side wall 84 in a continuous circumferential line 134. Each of the axial projections 142 preferably engages the inner surface 85 of the cylindrical side wall 84 in a continuous straight line 135. It will be apparent that there could be gaps in the lines of engagement 134, 135.

The projections 142, 144 forcefully engage the cylindrical side wall 84 of the combustion cup 44, as will be explained in more detail below, to space the axial end portions 148, 150 and the central portions 152 radially inward from the cylindrical side wall 84 of the combustion cup 44. Relatively small spaces 137, 138, 139 thus exist between the respective central portions 152 and axial opposite end portions 148, 150 of the prefilter 140 and the inner surface of the cylindrical side wall 84 of the combustion cup 44. The spaces 137, 138, 139 allow gas flow through the prefilter 140 and to the openings 86 in the cylindrical side wall 84.

If a gap exists in the lines of engagement 134, 135, the prefiltered gas can flow directly from the spaces 137, 138 to the space 139. If no gap exists in the lines of engagement 134, 135, the prefiltered gas in the spaces 137 can reenter the prefilter and again exit the prefilter and flow into the space 139. The prefiltered gas in the space 138 can flow to the space 139 through an axial passage that is located adjacent to a surface 154 (FIG. 2) of the prefilter 140.

The prefilter 140 includes a pair of end portions 160, 162 which circumferentially overlap by a distance OL. The distance OL is an arc measured in a plane extending normal to the axis A. The end portions 160, 162 include openings 146 which allow nitrogen gas to flow through the prefilter 140. The end portions 160, 162 may or may not include projections 142 or 144. The end portion 160 is illustrated in FIG. 2 as not having any projections, while the end portion 162 includes the circumferential projections 144.

The prefilter 140 is formed into a shape that is predisposed to expand resiliently in radial and circumferential directions relative to the axis A. The resiliency of the prefilter 140 assures that the projections 142, 144 remain forcefully engaged with the inner surface of the cylindrical side wall 84 of the combustion cup 44 to inhibit relative movement between the prefilter 140 and the combustion cup. Such relative movement between the prefilter 140 and the combustion cup 44 could produce a metal-on-metal noise which could be perceived as a rattle.

The prefilter 140 is forced to contract from a normally relaxed and expanded condition and size to a radially and circumferentially contracted condition and size that fits easily inside the combustion cup 44. The prefilter 140 is contracted and then placed within the combustion cup 44 during assembly of the inflator 20. The prefilter 140, when the force contracting the prefilter is removed, resiliently expands radially and circumferentially toward the expanded condition and size to engage the cylindrical side wall 84 of the combustion cup 44 forcefully. The predisposition of the prefilter 140 to expand resiliently toward the normally expanded condition and size maintains the prefilter forcefully engaged with the inner surface of the cylindrical side wall 84.

The prefilter 140 is preferably placed in the combustion cup 44 prior to the container 120 being placed in the combustion cup. The distance OL that the end portions 160, 162 overlap when the prefilter 140 is radially and circumferentially contracted to fit inside the combustion cup 44 is a first overlap length. The distance OL that the end portions 160, 162 overlap when the prefilter 140 expands from the contracted condition and size to engage the cylindrical side wall 84 is a second overlap length. The first overlap length is greater than the second overlap length.

An annular slag screen 180 is located in the lower end portion of the filter chamber 94, as viewed in FIG. 1. The slag screen 180 is located downstream from the prefilter 140 in the gas flow. The slag screen 180 is disposed radially outward of the flow openings 86 in the combustion cup 44. The slag screen 180 also filters hot particles in the nitrogen gas flowing from the prefilter 140 through the openings 86 in the combustion cup 44. The slag screen 180 also cools the nitrogen gas flowing through the slag screen.

An annular final filter 182 is located in the upper end portion of the filter chamber 94, as viewed in FIG. 1, and above the slag screen 180. The final filter 182 is located downstream in the nitrogen gas flow from the slag screen 180 to filter hot particles and cool the nitrogen gas further. An annular filter shield 184 projects radially inward from the diffuser side wall 64 and is located between the final filter 182 and the slag screen 180. The filter shield 184 is secured to the diffuser side wall 64 and defines an annular opening 186 which allows fluid communication between the upper and lower end portions of the filter chamber 94.

The inflator 20 includes an actuatable initiator assembly 200. The initiator assembly 200 includes an annular flange 201 that is welded at a continuous circumferential weld 206 to the center portion 100 of the cover 46. The initiator assembly 200 also includes an igniter portion 202 which projects through the opening 104 in the cover 46 and into a central main recess 204 formed in the container 120. The igniter portion 202 includes an ignitable pyrotechnic material (not shown), but otherwise may be of any suitable known construction. A pair of connectors 208 extend axially downward, as viewed in FIG. 1, from the igniter portion 202. Inside the igniter portion 202, the connectors 208 are connected to a resistance wire embedded in the pyrotechnic material. The connectors 208 are connected to an electrical actuation circuit (not shown) which includes a collision sensor.

In operation, upon the occurrence of a collision or other sudden vehicle deceleration indicative of a collision, the collision sensor closes. Electrical current is conducted to the connectors 208 of the igniter portion 202. The resistance wire heats and ignites the pyrotechnic material. Ignition of the pyrotechnic material generates hot initiating products which flow outward from the igniter portion 202 and rupture the material of the main recess 204 in the container 120. The initiating products ignite the gas generating disks 122.

The gas generating disks 122 burn and rapidly produce hot particles and a relatively large volume of hot nitrogen gas. The nitrogen gas generated by burning of the disks 122 flows radially outward through the prefilter 140 and into the spaces 137, 138, 139. Hot particles are carried in the flow of nitrogen gas. The prefilter 140 contacts and cools at least some of the nitrogen gas and hot particles as the nitrogen gas flows through the prefilter. The prefilter 140 removes hot particles from the flow of nitrogen gas which are larger than the openings 146. Particles which are smaller than the openings 146 and the nitrogen gas may flow through the prefilter 140, through the openings 86 in the combustion cup 44 and into the slag screen 180. Molten metal hot particles in the gas flow may plate out onto a surface of the prefilter 140.

The slag screen 180 removes and traps a portion of the relatively small hot particles from the flow of nitrogen gas. The slag screen 180 also cools the nitrogen gas. The nitrogen gas flows axially upward through the opening 186 in the filter shield 184 to the final filter 182. The nitrogen gas then flows radially outward through the final filter 182. The final filter 182 functions to remove most of the remaining relatively small hot particles from the flow of the nitrogen gas. The nitrogen gas flows through the outlet openings 66 into the air bag to inflate the air bag.

From the above description of the invention, those skilled in the art will perceive improvements, changes and modifications. For example, it will be apparent that projections which are circumferentially spaced around the outer surface of the prefilter 140 could be formed at an axial end portion of the prefilter, and other circumferentially spaced projections could be formed at another axial end portion of the prefilter at a location below the openings 86 in the cylindrical side wall 84 of the combustion cup 44. Such improvements, changes and modifications within the skill of the art are intended to be covered by the appended claims.

Having described the invention, the following is claimed:

1. An apparatus for inflating an air bag, said apparatus comprising:

a housing having a cylindrical inner surface defining a chamber;

an ignitable gas generating material in the chamber for, upon being ignited, producing a flow of combustion products, including gas to inflate the air bag and hot particles; and a filter for removing hot particles from the flow of combustion products, said filter being a tubular cylinder and located in said chamber between said gas generating material and said housing, said filter forcefully engaging said cylindrical inner surface of said housing, said filter being contractible circumferentially and radially from a first condition for insertion into the chamber, said filter expanding circumferentially and radially toward the first condition to provide the forceful engagement with said cylindrical inner surface of said housing when the force contracting the filter is removed;

said filter engaging said cylindrical inner surface of said housing at spaced apart locations, said filter being spaced radially from said cylindrical inner surface between said locations.

2. The apparatus of claim 1 wherein said filter comprises a curved strip of sheet metal having two end portions that overlap, said end portions overlapping to a greater extent when said filter is contracted for insertion into said chamber and overlapping to a lesser extent when said filter forcefully engages said inner surface.

3. The apparatus of claim 2 wherein said curved strip of sheet metal has a plurality of spaced apart circular openings through which said gas can flow.

4. The apparatus of claim 1 wherein said filter engages said cylindrical inner surface along a line of engagement extending around the outer circumference of said filter.

5. The apparatus of claim 4 wherein said filter engages said cylindrical inner surface along a pair of axially spaced apart parallel lines of engagement extending around the entire outer circumference of said filter.

6. The apparatus of claim 1 wherein said filter engages said cylindrical inner surface along a plurality of axially extending lines spaced around the outer circumference of said filter.

7. The apparatus of claim 1 wherein said filter comprises a circumferentially extending projection on the outer surface of said filter.

8. The apparatus of claim 1 wherein said filter comprises a pair of axially spaced and circumferentially extending projections on the outer surface of said filter.

9. The apparatus of claim 1 wherein said filter comprises a plurality of axially extending projections spaced about the outer surface of said filter.

10. The apparatus of claim 1 wherein said filter comprises a plurality of axially extending projections spaced about the outer surface of said filter and located between a pair of axially spaced and circumferentially extending projections on the outer surface of said filter.

11. An apparatus for inflating an air bag, said apparatus comprising:

a housing having a cylindrical inner surface and a chamber;

ignitable gas generating material in the chamber for, upon ignition, producing a flow of combustion products, including gas to inflate the air bag and hot particles; and a filter for removing hot particles from the flow of combustion products, said filter comprising a strip of material having two overlapping end portions, said filter forcefully engaging said cylindrical inner surface at spaced apart locations and being spaced radially from said cylindrical inner surface between said locations;

said filter being contractible from a first condition for insertion into the chamber, said overlapping end portions overlapping a first length when said filter is contracted, said filter returning toward said first condition and providing the forceful engagement with said cylindrical inner surface, said overlapping end portions overlapping a second length which is less than said first length when said filter forcefully engages said inner surface.

12. The apparatus of claim 11 wherein said filter forcefully engages said cylindrical inner surface of said housing along a circumferentially extending line of engagement.

13. The apparatus of claim 12 wherein said filter forcefully engages said cylindrical inner surface of said housing along a pair of axially spaced and circumferentially extending lines.

14. The apparatus of claim 11 wherein said filter forcefully engages said cylindrical inner surface of said housing at a plurality of circumferentially spaced and axially extending lines.

15. The apparatus of claim 11 wherein said filter forcefully engages said cylindrical inner surface of said housing along a first circumferential projection extending around said filter.

16. The apparatus of claim 15 further including a second circumferential projection on said filter for forcefully engaging said cylindrical inner surface of said housing at a location axially spaced from said first circumferential projection.

17. The apparatus of claim 11 wherein said filter forcefully engages said cylindrical inner surface of said housing at a plurality of circumferentially spaced and axially extending projections on said filter.

18. The apparatus of claim 17 wherein said filter is a perforated strip of sheet metal.

* * * * *